United States Patent [19]
Thompson et al.

[11] 3,775,204
[45] Nov. 27, 1973

[54] METHOD OF GASKETING THE MATING SURFACE OF HOUSING PARTS AND ENTRYWAYS FOR ELECTRICAL CONDUCTORS

[76] Inventors: John T. Thompson, 244 Loring St., Los Angeles, Calif. 90024; George W. Gillemot, 2331 20th St., Santa Monica, Calif. 90405

[22] Filed: July 6, 1971

[21] Appl. No.: 159,798

[52] U.S. Cl. ............... 156/53, 156/49, 156/152, 156/192, 156/247, 156/289, 117/6, 117/139, 277/228, 285/335, 285/423
[51] Int. Cl. ............... H01b 13/08, B65h 81/06
[58] Field of Search ............... 156/49, 51, 52, 53, 156/152, 185, 187, 191, 192, 228, 289, 247; 264/130, 131; 117/139, 6, 120, 163; 106/2; 277/228; 285/335, 346, 422

[56] References Cited
UNITED STATES PATENTS

| | | | |
|---|---|---|---|
| 3,239,247 | 3/1966 | Pickert | 277/228 X |
| 2,951,110 | 8/1960 | Matthysse et al. | 117/6 X |
| 2,825,587 | 3/1958 | Barta et al. | 285/423 X |
| 2,447,340 | 8/1948 | Jackson | 285/335 X |
| 3,580,756 | 5/1971 | Kashara et al. | 156/49 |
| 2,526,483 | 10/1950 | Ingmanson | 264/130 X |
| 1,528,263 | 3/1925 | Peelle | 264/130 |
| 3,645,820 | 2/1972 | Clary | 156/191 |

Primary Examiner—Alfred L. Leavitt
Assistant Examiner—Basil J. Lewris
Attorney—W. D. Sellers et al.

[57] ABSTRACT

A method of gasketing the mating surfaces of housing parts and entryways of electrical conductors with reusable gasketing material. Strips of spongy, closed-cell, elastomeric material are coated with permanently non-setting, gel-like potting compound and then placed between the mating surfaces of the housing parts or wrapped in one or more superimposed convolutions about the conductors so as to replace appropriate compression as the parts are secured in assembled relation.

5 Claims, 3 Drawing Figures

PATENTED NOV 27 1973　　　　　　　　　　　　　　　　3,775,204

INVENTORS.
JOHN T. THOMPSON
GEORGE W. GILLEMOT
BY
ATTORNEYS

METHOD OF GASKETING THE MATING SURFACE OF HOUSING PARTS AND ENTRYWAYS FOR ELECTRICAL CONDUCTORS

This invention relates to methods of gasketing separable parts and providing electrical bushings for electrical conductors, and more particularly to an improved method making use of reusable spongy elastomeric material coated with gel-like, water-repellant potting compound.

There is a wide variety of environments having need for a waterproof, non-conductive sealing gasket. This is particularly true as respects passageways for electrical conductors through protective housings as well as between the parts of access covers for electrical component housings. Illustrative of such operative environments are the splice housings for electrical cables of the type used in communication facilities. It is important that these and the like housings be reliably sealed against the entry of moisture yet be readily entered for inspection and servicing operations.

Various proposals and gasketing expedients have been proposed heretofore intended to meet these requirements but which are found lacking in one or more aspects. These undesirable characteristics and disadvantages are eliminated by the present invention. A particularly troublesome area is the entryway at the ends of cable splice housings. The size and type of cable entering these ends varies widely in type, material, and particularly the size thereof. Frequently the sealing gasket provided in these areas is subjected to severe stress changes with the result that a resilient stress-accommodating gasket is highly desirable. Strips of tacky Buna have been widely used and are wrapped about the cable to a suitable thickness and then compressed in semi-circular receiving channels formed in the inner sidewall of the housing ends. This material is easily applied and has sufficient flow characteristics to accommodate moderate stresses. However, it mates inseparably with underlying layers after assembly and with the result that it is difficult to remove and cannot be reused. Thus, upon reopening of the splice housing the prior sealing compound is normally dug away and disposed of after which a fresh supply of Buna tape is applied to the parts before reassembly.

The foregoing and other disadvantages of previously proposed gasketing expedients are eliminated by the present invention. The basic sealing material provided by this invention comprises thick sheeting of spongy, closed-cell, elastomeric material which is readily cut into strips of the desired width and length for a particular assembly. These strips are then coated with a thin layer of a gel-like potting compound having pronounced cohesive characteristics for the spongy material and other important and advantageous characteristics. These coated strips are then applied into seating channels extending along the mating surfaces of the housing and other strips are wrapped in successive layers about one or more cable ends about which the housing is being assembled until an appropriate diameter of bushing is achieved. This sealing bushing and gasket is then seated in receiving channels at the opposite ends at one of the housing halves after which the other housing half is seated thereover and the halves are clamped together to provide a waterproof hermetically sealed splice assembly.

Re-entry is achieved simply and easily by removing the fasteners and lifting the housing halves apart. If it is necessary for any reason to remove the bushing gasket encircling the cabling this is readily done. Before or reforming rewrapping the original gasket strip about the cable it is preferably recoated with the gel-like compound. The reassembled gasket is fully as serviceable and effective as when first assembled and remains so after repeated re-entry to the housing has been made.

Accordingly it is a primary object of the present invention to provide a new and improved method of assembling a moisture-proof, non-conductive permanently flexible, reformable seal between both metallic parts and about electrical conductors passing through a housing wall.

Another object of the invention is the method of forming a reusable, reformable moisture-proof, non-conductive seal between two surfaces.

Another object of the invention is the provision of a simple, highly effective and efficient method of sealing cables to the ends of splice housing assemblies and the mating surfaces of a separable splice housing.

These and other more specific objects will appear upon reading the following specification and claims and upon considering in connection therewith the attached drawing to which they relate.

Referring now to the drawing in which a preferred embodiment of the invention is illustrated:

Figure 1:
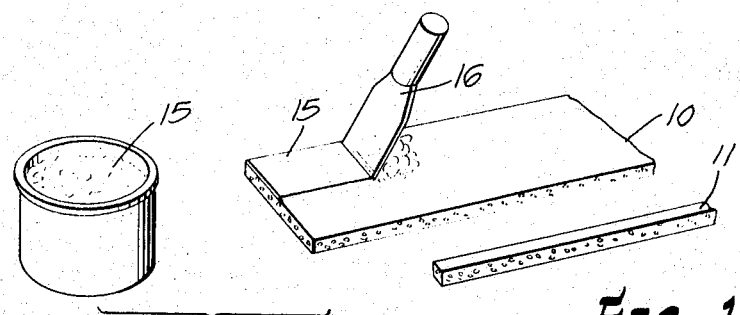
FIG. 1 is a perspective view showing the gasketing material being prepared for application.
Figure 2:
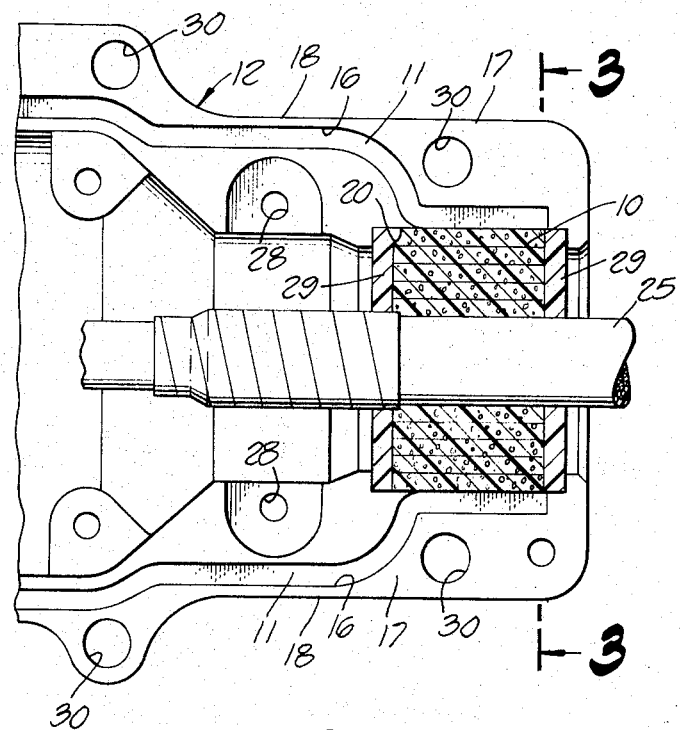
FIG. 2 is a plan view of a typical application of the invention gasket as used to seal the splice housing of a cable splice.
Figure 3:
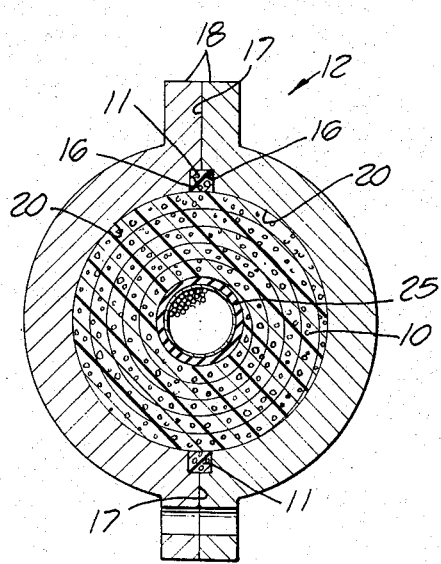
FIG. 3 is a cross sectional view of the assembled splice housing taken along line 3—3 on FIG. 2.

Referring initially to FIG. 1, there is shown two strips 10,11 of spongy, elastomeric material after they have been cut to an appropriate size for use with a two-part cable splice housing 12 of the type well known in the communication industry and one end of which is illustrated in FIGS. 2 and 3. The gasketing material is made in wide sheet form of relatively thick closed cell spongy material. Although either thermoplastic or rubber sponge may be used, thermoplastic spongy material has superior properties for many applications and is preferred. A thermoplastic composition having excellent temperature characteristics is desirable. It will also be understood that the gasketing material may be molded in strips of different standard width suitable for use in a particular application. In this case, the gasketing strip will have a continuous imperforate surface along all sides except the ends which are cut to length for a particular application.

After the gasket strip has been cut to length it is placed against a suitable supporting surface and coated on at least one surface with a layer of a permanent gel-like potting compound 15 using a suitable spreading tool 16. A preferred commercially available compound of this type is permanently non-setting, non-absorbent, water-repellant, non-conductive and having highly pronounced cohesive properties. After the opposed surfaces of strip 11 have been coated it is assembled into channelway 16 extending along faces 17 of the splice housing flanges 18. It will be noted that the inner sidewalls of channels 16 open into the semi-cylindrical channels 20 extending along the sidewalls of the openings at the opposite ends of the housing halves in order that strips 11 can contact and seal against strip 10

(FIG. 2). It will be understood that each end of the housing is similarly constructed.

Gasketing strip 10 is not applied to cable 25 until the cable anchor assembly, not shown, has been applied. This anchor assembly is preferably of the type disclosed in our copending application for U.S. Pat. Ser. No. 12,819, now U.S. Pat. No. 3,614,298, filed Feb. 19, 1970. As therein disclosed, this anchorage comprises a bridging strap having a bowed midportion straddling the cable and with its mid portion rigidly clamped to the cable sheath and its ends formed with holes to receive cap screws securable in the threaded bores 28 formed in one of the casing halves to either side of the cable. Since the cable anchorage forms no part of the present invention and may take any of various forms, further description thereof is unnecessary.

Before the cable is actually anchored to one of the casing halves the portion outwardly of this anchorage is snugly wrapped with successive superimposed layers of the coated strip 10. Only moderate tension is applied to the strip during the wrapping operation and a sufficient number of turns are applied to provide a bushing ring having a diameter slightly in excess of the diameter of the semicylindrical seating surface 20. End rings 29 of semi-rigid, non-conductive material are positioned snugly against the opposite ends of the bushing ring. These rings have an outer diameter conforming with that of the seating surfaces 20. The gasketing and bushing ring assembly is inserted into the seat in the splice housing as is shown in FIG. 2. Thereafter, the upper housing half having the same shape and configuration as the lower half is applied over the assembly and the mating surfaces 17,17 of the two halves are forced toward one another by assembling bolts not shown through openings 30,30 in the flanges of the housing. As the bolts are tightened, gaskets 10,11 are placed under compression. As will be recognized, the compression of the gel-coated gasket strips 10,11 completes the sealing operation and maintains the splice housing hermetically sealed until reopened.

When it is necessary to re-enter the assembly the operator removes the clamping bolt and lifts the housing halves apart. Each of the gasket strips is then free for removal after releasing the clamping anchorage for the cable. If it is necessary for any reason to remove the gasket strips, they may be wiped clean of potting compound and reassembled after first recoating their surfaces with fresh compound. This assures the presence of a layer of adequate thickness for reliable resealing upon assembly of the parts. The gasket material itself may be reused many times and retains its full effectiveness over a period of years irrespective of the number of times of reuse.

While the particular method of gasketing the mating surface of housing parts and entryways for electrical conductors herein shown and disclosed in detial is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

We claim:

1. That method of gasketing a protective conductor splice housing having separable parts for electrical conductors extending between the interior and exterior through an opening in the housing wall which comprises: coating opposed surfaces of a strip of closed-cell spongy elastomeric material with permanently non-setting, non-conductive gel-like potting compound, placing said coated strip between the mating surface of the separable parts of said housing so as to partially compress said strip as said housing parts are clamped together, wrapping another similarly coated strip of said spongy material about said conductors with the number of convolutions required to provide a thickness in excess of the gap between the conductors and the housing opening through which the conductors extend, and holding the wrapped strip in place while assembling the same in said housing opening.

2. That method defined in claim 1 characterized in the step of placing a ring of non-conductive material against the opposite axial ends of said wrapping about the conductors, and securing said rings in place in the housing opening.

3. That method of gasketing the two halves of a cable splice housing with reusable and reformable gasketing material which comprises preparing separate strips of closed-cell resilient elastomeric material in appropriate lengths and widths to form gaskets between the two halves of the splice housing and between the cables entering the ends thereof, coating said strips with non-setting moisture-proof gel-like potting compound, placing certain of said coated strips along either lateral edge of the housing halves, wrapping other of said coated strips about a portion of the cable juxtaposed to the ends of the housing halves with the number of convolutions required to provide a thickness in excess of the gap being gasketed, holding said wrapped stripping in place as the housing halves are assembled to the opposite sides of the wrapped cable, and securing said housing halves together to compress the intervening strips of elastomeric material.

4. That method defined in claim 3 characterized in the steps of reusing said strips of elastomeric material during repeated openings and reclosings of said splice housing using renewed coatings of said gel-like potting compound.

5. That method defined in claim 3 characterized in the step of wrapping the cable with said spongy strip between rings of non-conductive material spaced apart by the width of said strip and sealing the rims of said rings in recesses formed in the juxtaposed surfaces at the opposite ends of said housing halves.

* * * * *